United States Patent
Lee et al.

(10) Patent No.: US 7,512,337 B2
(45) Date of Patent: Mar. 31, 2009

(54) GIGABIT ETHERNET PASSIVE OPTICAL NETWORK HAVING DOUBLE LINK STRUCTURE

(75) Inventors: Min-Hyo Lee, Suwon-si (KR); Young-Seok Kim, Seongnam-si (KR); Yun-Je Oh, Yongin-si (KR); Tae-Sung Park, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 816 days.

(21) Appl. No.: 10/827,815

(22) Filed: Apr. 20, 2004

(65) Prior Publication Data

US 2005/0047332 A1     Mar. 3, 2005

(30) Foreign Application Priority Data

Aug. 26, 2003   (KR) .................... 10-2003-0059015

(51) Int. Cl.
*H04B 10/08*   (2006.01)
*H04L 12/26*   (2006.01)

(52) U.S. Cl. .................... 398/20; 398/66; 398/166; 370/216

(58) Field of Classification Search ............... 398/1–8, 398/50, 58, 66–68, 70–72; 370/216
See application file for complete search history.

(56) References Cited

U.S. PATENT DOCUMENTS

| | | | |
|---|---|---|---|
| 4,404,672 A * | 9/1983 | Shimizu | 370/294 |
| 6,226,703 B1 * | 5/2001 | Ervin et al. | 710/312 |
| 6,771,908 B2 * | 8/2004 | Eijk et al. | 398/66 |
| 7,058,007 B1 * | 6/2006 | Daruwalla et al. | 370/216 |
| 7,230,926 B2 * | 6/2007 | Sutherland et al. | 370/241 |
| 2001/0023189 A1 * | 9/2001 | Kajimura | 455/522 |
| 2002/0021472 A1 * | 2/2002 | Nakaishi | 359/168 |
| 2002/0030865 A1 * | 3/2002 | Kawate et al. | 359/110 |
| 2002/0030875 A1 * | 3/2002 | Kim et al. | 359/168 |
| 2003/0002114 A1 * | 1/2003 | Takemoto et al. | 359/168 |
| 2004/0047640 A1 * | 3/2004 | Knaack et al. | 398/209 |
| 2005/0008158 A1 * | 1/2005 | Huh et al. | 380/256 |

FOREIGN PATENT DOCUMENTS

| | | |
|---|---|---|
| CN | 1338832 | 3/2002 |
| CN | 1433192 | 7/2003 |

* cited by examiner

*Primary Examiner*—Kenneth N Vanderpuye
*Assistant Examiner*—Danny W Leung
(74) *Attorney, Agent, or Firm*—Cha & Reiter, LLC (57) ABSTRACT

A Gigabit Ethernet passive optical network (GE-PON) having a double link structure is disclosed. The GE-PON includes an optical line terminal (OLT), a plurality of optical couplers, and a plurality of optical network units (ONUs). The OLT sets up an active link and a standby link in response to a registration request message received over an optical cable. Each of the ONUs is doubly connected with the OLT via the optical cable and is adapted to transmit the registration request message to the OLT, form the active link with the OLT via the optical cable if it receives an active registration message transmitted from the OLT in response to the registration request message, and form the standby link with the OLT via the optical cable if it receives a standby message from the OLT. The optical couplers are disposed between the OLT and each of the ONUs to doubly interconnect them via different optical cables.

18 Claims, 7 Drawing Sheets

GIGABIT ETHERNET PASSIVE OPTICAL NETWORK HAVING DOUBLE LINK STRUCTURE

CLAIM OF PRIORITY

This application claims priority to an application entitled "GIGABIT ETHERNET PASSIVE OPTICAL NETWORK HAVING DOUBLE LINK STRUCTURE," filed in the Korean Intellectual Property Office on Aug. 26, 2003 and assigned Serial No. 2003-59015, the contents of which are hereby incorporated by reference.

BACKGROUND OF THE INVENTION

1. Field of the Invention

The present invention relates to a Gigabit Ethernet passive optical network (GE-PON) having an optical line terminal (OLT) and a plurality of optical network units (ONUs) and, more particularly, to a GE-PON having a double link structure to address a link failure between the OLT and each ONU, and a double link method using the same.

2. Description of the Related Art

A passive optical network (PON) is a communication network that transfers signals to end users over an optical cable network. The PON consists of a single OLT installed in a communication facility and a plurality of ONUs installed nearby the subscribers, typically a maximum of 32 ONUs connectable to one OLT.

In the PON, the OLT transmits a signal to an ONU via an optical fiber. The ONU receives the signal transmitted from the OLT, processes it in a predetermined manner and then transfers the processed result to an end user. Thus, the ONU is an optical network termination unit that provides a service interface to the end user.

The ONU accommodates FTTC (Fiber To The Curb), FTTB (Fiber To The Building), FTTF (Fiber To The Floor), FTTH (Fiber To The Home), FTTO (Fiber To The Office), etc. In this type of connection, the ONU is implemented to provide a high service accessibility to the subscriber. The ONU functions to interconnect a cable connecting the subscriber for the transmission of an analog signal therefrom, and an optical equipment connecting the OLT for the transmission and reception of optical signals thereto/therefrom. Accordingly, the ONU performs an optical/electrical conversion operation to convert an optical signal from the OLT into an electrical signal for subsequent transmission to the subscriber, as well as an electrical/optical conversion operation to convert an electrical signal from the subscriber into an optical signal for subsequent transmission to the OLT.

Figure 1:
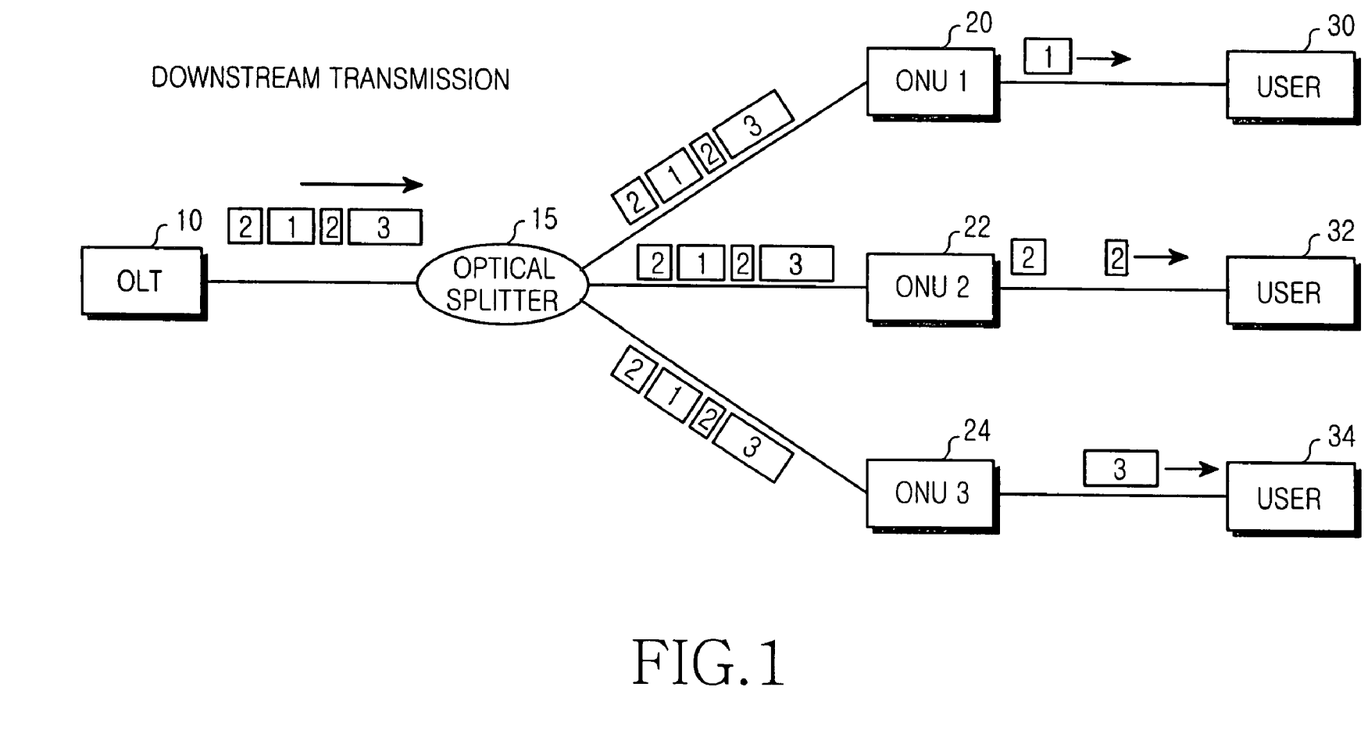
FIG. 1 is a view showing a downstream data transmission structure of a Gigabit Ethernet passive optical network.
Figure 2:
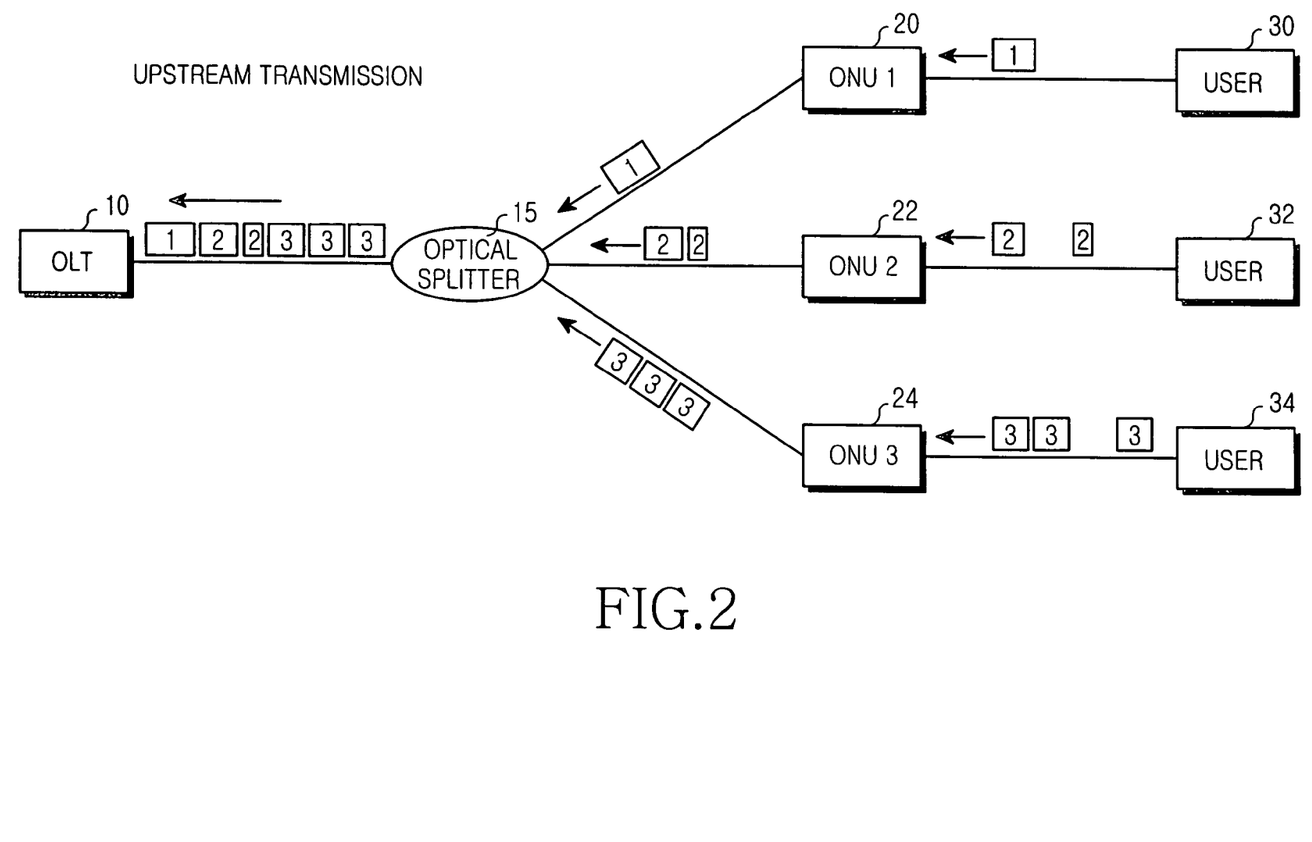
FIG. 2 is a view showing an upstream data transmission structure of the Gigabit Ethernet passive optical network.

FIG. 1 shows a downstream data transmission structure of a Gigabit Ethernet passive optical network, and FIG. 2 shows an upstream data transmission structure of the Gigabit Ethernet passive optical network.

As shown in FIGS. 1 and 2, the Gigabit Ethernet passive optical network (GE-PON) has a structure of one OLT 10 connected to a plurality of ONUs 20, 22 and 24 in a tree form via an optical splitter 15. The GE-PON is considered to be less expensive and more efficient than an AON (Activity-On-Node) network.

Prior to the development of the GE-PON, an asynchronous transfer mode passive optical network (ATM-PON) has been developed and standardized. The ATM-PON transmits ATM cells in the form of a block in the upstream or downstream direction. Also, an Ethernet passive optical network (E-PON) has been developed to transmit packets of different sizes in the form of a block. As such, the E-PON has a complex control structure compared with the ATM-PON.

Referring to FIG. 1, during the downstream transmission, the OLT 10 broadcasts data to be transmitted to the ONUs 20, 22 and 24. The optical splitter 15 receives the data broadcast from the OLT 10 and transmits the received data to each of the ONUs 20, 22 and 24. Each of the ONUs 20, 22 and 24 detects data to be transferred to a corresponding one of users 30, 32 and 34 via the optical splitter 15 and receives only the detected data to the corresponding user 30, 32 or 34.

Referring to FIG. 2, in the upstream transmission, data from the users 30, 32 and 34 are transferred to the ONUs 20, 22 and 24, respectively. The ONUs 20, 22 and 24 transmit the data from the users 30, 32 and 34 to the optical splitter 15 according to a transmission permission protocol from the OLT 10, respectively. At this time, each of the ONUs 20, 22 and 24 transmit the received data during a time slot set in a TDM (Time Division Multiplexing) manner. Therefore, there is no data collision resulting during the upstream data transmission in the optical splitter 15.

However, the OLT 10 and each of the ONUs 20, 22 and 24 are interconnected by a single link set up therebetween via the optical splitter 15. As a result, if a failure occurs in the link set up between the OLT 10 and each of the ONUs 20, 22 and 24, it is impossible to perform the communication and requires a large amount of time to recover from the link failure.

SUMMARY OF THE INVENTION

Therefore, the present invention has been made in view of the above problems and provides additional advantages, by providing a GE-PON capable of readily recovering from the link failure even though a failure occurs in a single link set up between an OLT and each ONU, and a link setup method using the same.

One aspect of the present invention is to provide a GE-PON capable of rapidly recovering from the link failure than the prior art when a failure occurs in a single link set up between an OLT and each ONU, and a link setup method using the same.

Another aspect of the present invention is to provide a GE-PON which is capable of stably transmitting data while minimizing loss of the data when a failure occurs in a single link set up between an OLT and each ONU, and a link setup method using the same.

Yet another aspect of the present invention is to provide a Gigabit Ethernet passive optical network, which includes: an optical line terminal (OLT) for setting up an active link and a standby link with a device in response to a registration request message received over an optical cable; and at least one optical network unit (ONU) connected with the OLT in a double structure via the optical cable. The ONU transmits the registration request message to the OLT, forming the active link with the OLT via the optical c able if it receives an active registration message transmitted from the OLT in response to the registration request message, and then forms the standby link with the OLT via the optical cable if it receives a standby message from the OLT.

Preferably, the OLT is adapted to determine whether there is a link set up based on an ID of the ONU upon receiving the registration request message from the ONU, and transmit the active registration message for the setup of the active link to the ONU if there is no link set up based on the ID of the ONU. The ONU is adapted, if it receives the active registration message from the OLT, to form the active link with the OLT and then transmit an active registration acknowledgement message to the OLT in order to respond to the active registration message.

Further, the OLT is adapted to transmit the standby message to setup the standby link to the ONU if there is a link set up based on the ID of the ONU. The ONU is adapted, if it receives the standby message from the OLT, to form the standby link with the OLT and then transmit a standby acknowledgement message to the OLT in order to respond to the standby message.

Preferably, the Gigabit Ethernet passive optical network may further comprise at least one optical coupler disposed between the OLT and the ONU for doubly interconnecting them via different optical cables.

According to another aspect of the present invention, the OLT is adapted, if there is no data received from the ONU over the active link for a predetermined reference time, to determine that there is an error in the active link and then replace the standby link for the active link. Here, the reference time corresponds to a predetermined number of communication periods between the OLT and the ONU. Preferably, the reference time may be any one of times corresponding to two to fifteen communication periods between the OLT and the ONU. More preferably, the reference time may correspond to five communication periods between the OLT and the ONU, and each of the communication periods between the OLT and the ONU may be 2 msec. Alternatively, the reference time may be any one of 4 to 30 msec, preferably 10 msec.

According to another aspect of the present invention, a desired replacement time is required for replacing the standby link for the active link due to an error in the active link. The desired replacement time may include a first time required for the OLT to determine whether there is an error in the active link, a second time required for the OLT to transmit the active registration message to the ONU over the standby link and for the ONU to receive the active registration message, and a third time required for the OLT to receive an active registration acknowledgement message transmitted from the ONU in response to the active registration message. Preferably, the first time may be 10 msec, the second time may be 2 msec, and the third time may be 2 msec. Thus, the desired replacement time may be 14 msec.

In accordance with another aspect of the present invention, there is provided a link setup method using a Gigabit Ethernet passive optical network, the network including an OLT and at least one ONU doubly connected with the OLT. The method includes the steps of: a) determining whether there is a link set up based on an ID of the ONU when a registration request message from the ONU is received; and b) setting up an active link between the OLT and the ONU if there is no link set up based on the ID of the ONU, and a standby link between the OLT and the ONU if there is a link set up based on the ID of the ONU.

Preferably, the active link setup at the step b) may include the steps of: registering the ID of the ONU included in the registration request message as an active link ID; allocating a bandwidth to the ONU in response to a bandwidth allocation request included in the registration request message; transmitting an active registration message for active link setup including information about the allocated bandwidth to the ONU; and setting up the active link with the ONU if it receives the active registration message, and then receiving an active registration acknowledgement message transmitted from the ONU in response to the active registration message.

Further, the standby link setup at the step b) may include the steps of: transmitting a standby message to the ONU to set up the standby link with the ONU; and setting up the standby link with the ONU if it receives the standby message, and then receiving a standby acknowledgement message transmitted from the ONU in response to the standby message.

Preferably, the link setup method may further comprise the steps of: c) transmitting an active registration message to the ONU to replace the standby link for the active link if there is no message received over the active link for a predetermined time; and d) setting up the standby link replaced for the active link with the ONU if it receives the active registration message, and then receiving an active registration acknowledgement message transmitted from the ONU in response to the active registration message.

According to the teachings of the present invention, a double link having an active link and standby link is set up between an OLT and each ONU and, if there is an error in the active link, the standby link replaces the active link, thereby making it possible to more readily recover from the link error. Further, a reference time for the active link error determination is set to 10 msec at minimum, thereby minimizing data loss resulting from the link error.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the annexed drawings. In the drawings, the same or similar elements are denoted by the same reference numerals even though they are depicted in different drawings. For the purposes of clarity and simplicity, a detailed description of known functions and configurations incorporated herein will be omitted as it may make the subject matter of the present invention unclear.

Figure 3:
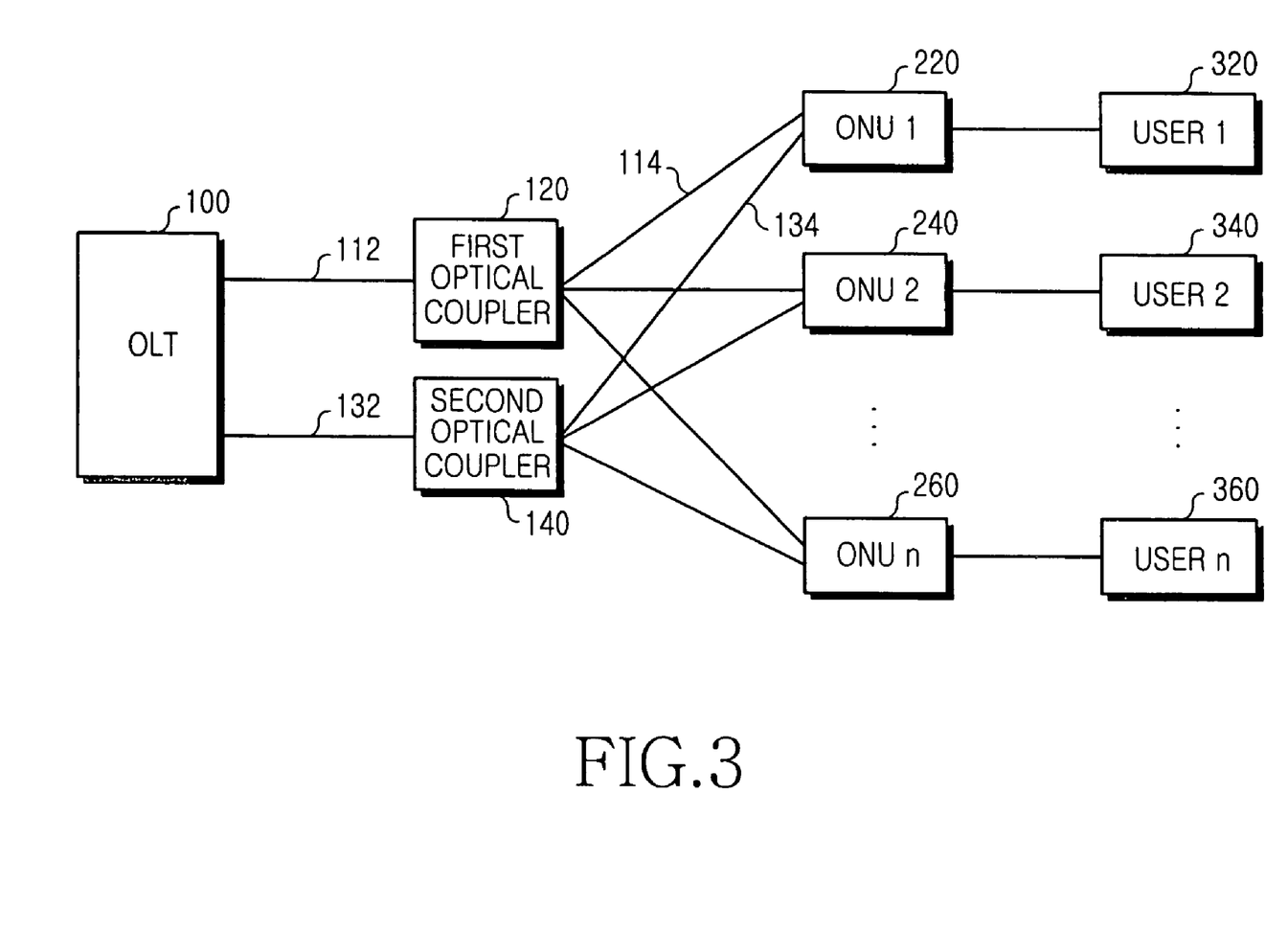
FIG. 3 is a block diagram showing a preferred embodiment of a Gigabit Ethernet passive optical network provided against a link failure according to the present invention.

Referring to FIG. 3, a preferred embodiment of a Gigabit Ethernet passive optical network to address a link failure according to the present invention is illustrated. As shown, the Gigabit Ethernet passive optical network (GE-PON) includes an OLT 100, a plurality of ONUs 220, 240 and 260, and first and second optical couplers 120 and 140. The OLT 100 and each of the ONUs 220, 240 and 260 are interconnected by optical cables via the first and second optical couplers 120 and 140.

In operation, the OLT 100 sets up a link with each of the ONUs 220, 240 and 260 in response to a registration request therefrom. A link formed between the OLT 100 and each of the ONUs 220, 240 and 260 via the first optical coupler 120 will hereinafter be referred to as a first link, and a link formed between the OLT 100 and each of the ONUs 220, 240 and 260 via the second optical coupler 140 will hereinafter be referred to as a second link. The double link signifies an aggregation of the first link and second link formed between the OLT 100 and each of the ONUs 220, 240 and 260. Preferably, any one of the first and second links is an active link and the other is a standby link. The active link is a channel for actual data transmission and reception between the OLT 100 and each of the ONUs 220, 240 and 260. The standby link is a spare link to be replaced for the active link between the OLT 100 and each of the ONUs 220, 240 and 260 when a failure occurs in the active link. In the present embodiment, upon receiving the registration request from each of the ONUs 220, 240 and 260, the OLT 100 sets up an active link if there is no link set up.

In the present embodiment, if the OLT 100 receives the registration request from each of the ONUs 220, 240 and 260, then it determines whether there is a link set up based on an ID of each of the ONUs 220, 240 and 260. The OLT 100 sets up the active link with each of the ONUs 220, 240 and 260 if there is no link set up, and sets up the double link with each of the ONUs 220, 240 and 260 if there is link set up. Note that depending on service provider's network development policy, the double link may be set up when the active link is being set up.

Thereafter, the ONUs 220, 240 and 260 communicate with users 320, 340 and 360 in a general manner, respectively.

In the present embodiment, the OLT 100 determines whether there is an error in the active link of the doubly set-up links, in the following manner. A unidirectional communication period between the OLT 100 and each of the ONUs 220, 240 and 260 in the active link state is set to 2 msec. If the OLT 100 unidirectionally receives no data from each of the ONUs 220, 240 and 260 successively for five communication periods, it determines that the set-up active link is in error. That is, in the present embodiment, if there is no data received from each of the ONUs 220, 240 and 260 for 10 msec, the active link is determined to be in error. In alternate embodiment, the reference time for the active link error determination may be variable. For example, if the OLT 100 unidirectionally receives no data from each of the ONUs 220, 240 and 260 successively for two communication periods (4 msec) at minimum to fifteen communication periods (30 msec) at maximum, it may determine that the active link is in error.

Upon determining that the active link is in error, the OLT 100 performs an operation of replacing the active link with the standby link of the doubly set-up links. Namely, if there is an error in the active link set up with each of the ONUs 220, 240 and 260, the OLT 100 registers an ID of each ONU as an active link ID and then transmits an active registration message to each ONU. Each ONU forms an active link with the OLT 100 via the standby link in response to the active registration message from the OLT 100 and then transmits an active registration acknowledgement message to the OLT 100.

Therefore, the double link consists of the active link and standby link is set up between the OLT 100 and each of the ONUs 220, 240 and 260 and, if there is an error in the active link, the standby link replaces the active link, thereby making it possible to more readily recover from the link error. Further, the reference time for the active link error determination is set to 10 msec at minimum, so that data loss resulting from the link error can be minimized.

Now, a description will be given of a double link setup procedure and a link error-based link replacement procedure with reference to the drawings. The double link setup procedure and the link replacement procedure between the OLT 100 and each of the ONUs 220, 240 and 260 are equally applied, so to avoid redundancy, only the double link setup procedure and link replacement procedure between the OLT 100 and the ONU 220 will be described in detail.

Figure 4:
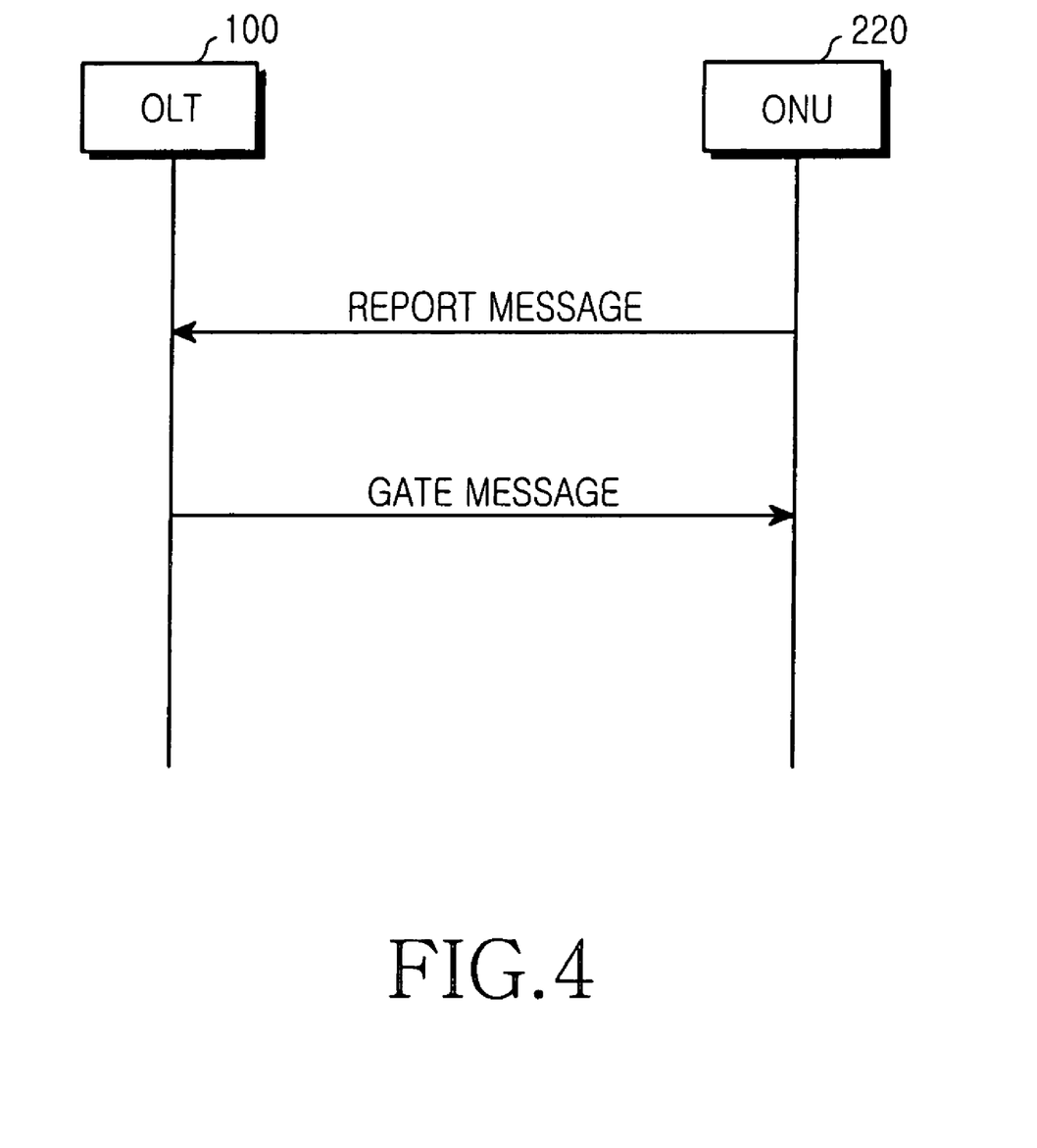
FIG. 4 is a view schematically illustrating a communication syntax between an OLT and each ONU.

FIG. 4 schematically illustrates a communication syntax between the OLT 100 and the ONU 220. As shown, in the GE-PON, the OLT 100 and the ONU 220 exchange a report message and a gate message with each other at a predetermined period. For example, the ONU 220 transmits a report message including a bandwidth allocation request signal to the OLT 100, and the OLT 100 allocates a bandwidth to the ONU 220 in response to the bandwidth allocation request signal included in the report message and transmits a gate message containing information regarding the allocated bandwidth to the ONU 220.

At this time, the OLT 100 and the ONU 220 exchange the report message and the gate message with each other within a time interval of 4 msec. In other words, a unidirectional communication period between the OLT 100 and the ONU 220 is 2 msec. In the present embodiment, whether there is a link error is determined according to whether the report message and the gate message are transmitted and received at the predetermined unidirectional communication period. In the present embodiment, a reference time for the link error determination is five periods, 10 msec.

Figure 5:
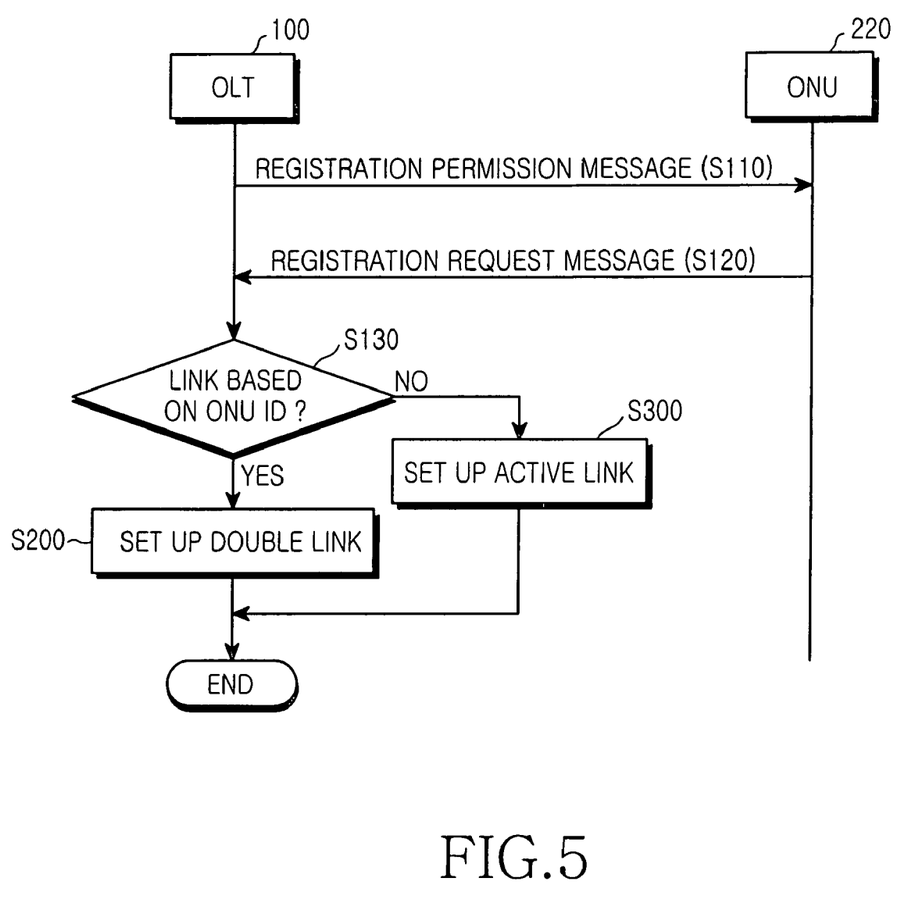
FIG. 5 is a flow chart illustrating a double link method using the Gigabit Ethernet passive optical network according to the present invention.

FIG. 5 is a flow chart performing a double link method using the Gigabit Ethernet passive optical network according to the present invention.

First, the OLT 100 transmits a registration permission message for the formation of an active link to the ONU 220 (S110). The ONU 220 transmits a registration request message to the OLT 100 in response to the registration permission message (S120).

The OLT 100 receives the registration request message from the ONU 220 and then determines whether there is a link formed based on an ID of the ONU 220 (S130). Upon determining that there is no link formed, the OLT 100 registers the ID of the ONU 220 as an active link ID and then sets up an active link with the ONU 220 (S300) via the standby link. However, if there is a link formed, the OLT 100 sets up a double link with the ONU 220 (S200).

Figure 6:
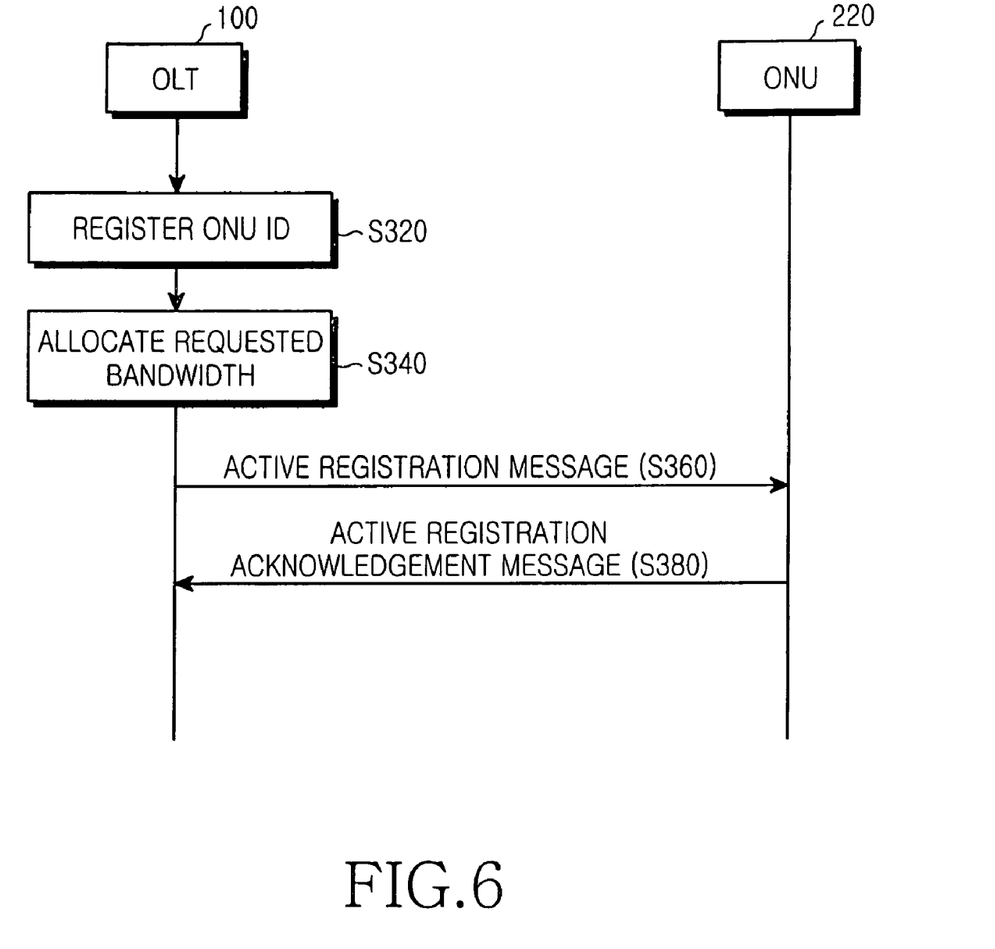
FIG. 6 is a flow chart illustrating an active link setup step in FIG. 5 in detail.

FIG. 6 is a flow chart illustrating the active link setup step S300 in FIG. 5 in detail.

First, if it is determined that there is no link formed based on the ID of the ONU 220, the OLT 100 registers the ID of the ONU 220 as the active link ID (S320). The OLT 100 allocates a bandwidth to the ONU 220 in response to a bandwidth allocation request included in registration request information from the ONU 220 (S340).

The OLT 100 transmits an active registration message for active link setup with the ONU 220, including information about the allocated bandwidth, to the ONU 220 (S360). Upon receiving the active registration message, the ONU 220 sets up an active link with the OLT 100 and then transmits an active registration acknowledgement message to the OLT 100 to respond to the active registration message (S380).

In the present embodiment, the active link set up between the OLT 100 and the ONU 220 is a first link formed by the first optical coupler 120 and optical cables 112 and 114 connected thereto.

Figure 7:
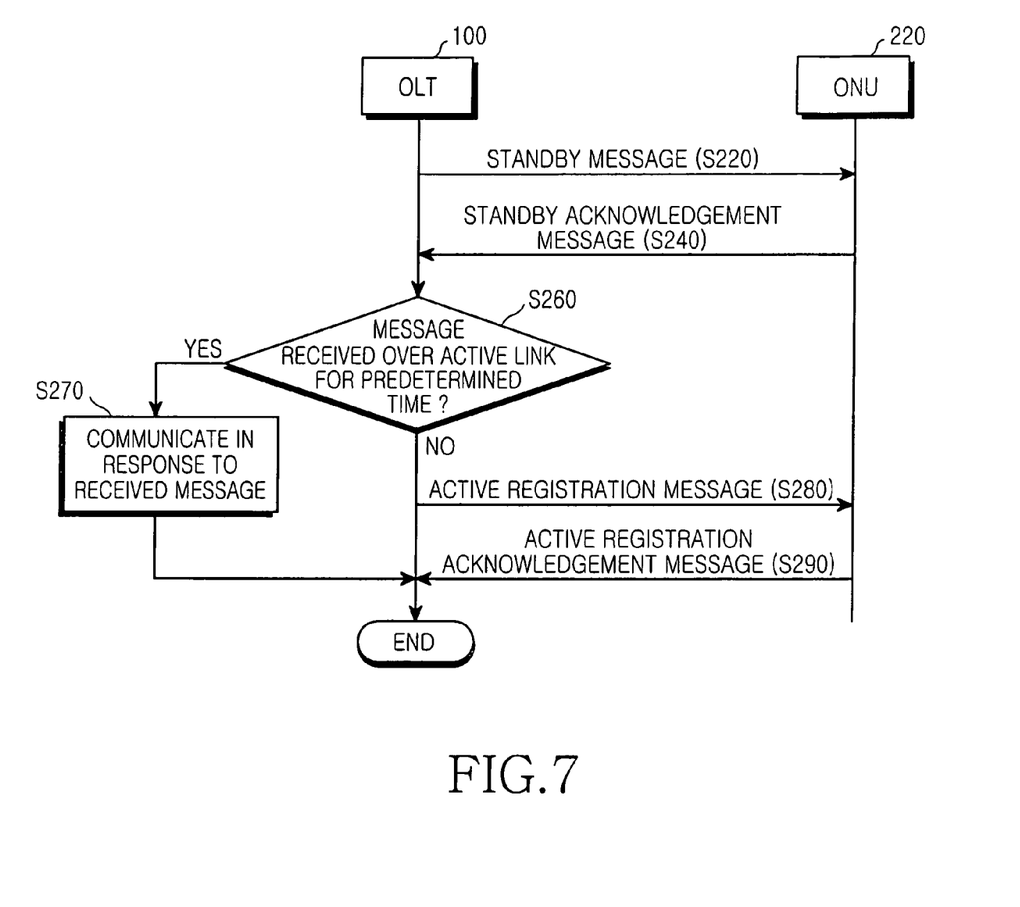
FIG. 7 is a flow chart illustrating a double link setup step in FIG. 5 in detail.

FIG. 7 is a flow chart illustrating the double link setup step S200 in FIG. 5 in detail.

First, if it is determined that there is a link formed based on the ID of the ONU 220, the OLT 100 transmits a standby message for standby link setup to the ONU 220 (S220). Upon receiving the standby message, the ONU 220 sets up a standby link with the OLT 100 in addition to the active link and then transmits a standby acknowledgement message to the OLT 100 to respond to the standby message (S240).

In the present embodiment, the standby link set up between the OLT 100 and the ONU 220 in addition to the active link is a second link formed by the second optical coupler 140 and optical cables 132 and 134 connected thereto.

During the double link setup state, the OLT 100 determines whether there is no message received from the ONU 220 over the active link (or the first link) for a predetermined time (10 msec) (S260). Upon determining that there is a message received from the ONU 220 over the active link for the predetermined time, the OLT 100 communicates with the ONU 220 in response to the received message (S270).

However, if it is determined at step S260 that there is no message received from the ONU 220 over the active link for the predetermined time, the OLT 100 transmits an active registration message for the active link setup to the ONU 220 over the standby link formed by the second optical coupler 140 and the optical cables 132 and 134 connected thereto (S280). Upon receiving the active registration message, the ONU 220 replaces the active link with the standby link and then transmits an active registration acknowledgement message to the OLT 100 to respond to the active registration message (S290).

In the present embodiment, the total replacement time required for performing link error recognition and the resulting active link replacement between the OLT 100 and the ONU 220 can be expressed as in the below equation 1.

Total replacement time (14 msec)=link error recognition time (10 msec)+active registration message transmission time (2 msec)+active registration acknowledgement message reception time (2 msec)  [Equation 1]

Therefore, if an OLT receives a registration request message from an ONU with an active link set up, it sets up a double link with the ONU by forming a standby link in addition to the active link. If there is an error in the active link, the standby link replaces the active link, thereby making it possible to readily recover from the link error and reduce data loss.

As apparent from the above description, according to the present invention, a double link composed of an active link and standby link is set up between an OLT and each ONU and, if there is an error in the active link, the standby link replaces the active link, thereby making it possible to more readily recover from the link error. Further, a reference time for the active link error determination is set to 10 msec at minimum, so data loss resulting from the link error can be minimized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Gigabit Ethernet passive optical network comprising:
   an optical line terminal (OLT) for setting up an active link and a standby link in response to a registration request message received over an optical cable; and
   at least one optical network unit (ONU) coupled to said OLT via said optical cable, said ONU transmitting said registration request message to said OLT, forming said active link with said OLT upon receiving an active registration message transmitted from said OLT in response to said registration request message, and forming said standby link with said OLT if it receives a standby message from said OLT;
   wherein the OLT sets up the active link with the ONU via the standby link, and if a link has already been formed, said OLT sets up a double link;
   wherein a desired replacement time is required for replacing said standby link for said active link due to an error in said active link, said desired replacement time including a first time required for said OLT to determine whether there is an error in said active link, a second time required for said OLT to transmit said active registration message to said ONU over said standby link and for said ONU to receive said active registration message, and a third time required for said OLT to receive an active registration acknowledgement message transmitted from said ONU in response to said active registration message.

2. The Gigabit Ethernet passive optical network as set forth in claim 1, wherein:
   said OLT is adapted to determine whether there is a link set up based on an ID of said ONU in response to said registration request message from said ONU, and transmit said active registration message for the setup of said active link to said ONU if there is no link set up; and
   said ONU is adapted to form said active link with said OLT in response to said active registration message from said OLT, and then transmit an active registration acknowledgement message to said OLT.

3. The Gigabit Ethernet passive optical network as set forth in claim 2, wherein:
   said OLT is adapted to transmit said standby message for the setup of said standby link to said ONU if there is a link set up; and
   said ONU is adapted to form said standby link with said OLT in response to said standby message from said OLT and then transmit a standby acknowledgement message to said OLT to respond to said standby message.

4. The Gigabit Ethernet passive optical network as set forth in claim 3, further comprising at least one optical coupler disposed between said OLT and said ONU for doubly interconnecting them via different optical cables.

5. The Gigabit Ethernet passive optical network as set forth in claim 1, wherein said OLT is adapted to, if there is no data received from said ONU over said active link for a predetermined reference time, determine that there is an error in said active link and then replace said standby link for said active link.

6. The Gigabit Ethernet passive optical network as set forth in claim 5, wherein said reference time corresponds to a predetermined number of communication periods between said OLT and said ONU.

7. The Gigabit Ethernet passive optical network as set forth in claim 6, wherein said reference time ranges between two to fifteen communication periods between said OLT and said ONU.

8. The Gigabit Ethernet passive optical network as set forth in claim 7, wherein said reference time corresponds to five communication periods between said OLT and said ONU.

9. The Gigabit Ethernet passive optical network as set forth in claim 7, wherein each of said communication periods between said OLT and said ONU is 2 msec.

10. The Gigabit Ethernet passive optical network as set forth in claim 9, wherein said reference time is between 4 to 30 msec.

11. The Gigabit Ethernet passive optical network as set forth in claim 10, wherein said reference time is 10 msec.

12. A Gigabit Ethernet passive optical network comprising:

an optical line terminal (OLT) for setting up an active link and a standby link in response to a registration request message received over an optical cable; and at least one optical network unit (ONU) coupled to said OLT via said optical cable, said ONU transmitting said registration request message to said OLT, forming said active link with said OLT upon receiving art active registration message transmitted from said OLT in response to said registration request message, and forming said standby link with said OLT if it receives a standby message from said OLT;

wherein the OLT sets un the active link with the ONU via the standby link, and if a link has already been formed, said OLT sets up a double link, wherein said OLT is adapted to, if there is no data received from said ONU over said active link for a predetermined reference time, determine that there is an error in said active link and then replace said standby link for said active link;

wherein said reference time corresponds to a predetermined number of communication periods between said OLT and said ON corresponding to about five communication periods between said OLT and said ONU; wherein each of said communication periods between said OLT and said ONU is 2 msec;

wherein said reference time comprises about 10 msec; and wherein a desired replacement time is required for replacing said standby link for said active link due to an error in said active link, said desired replacement time including a first time required for said OLT to determine whether there is an error in said active link, a second time required for said OLT to transmit said active registration message to said ONU over said standby link and for said ONU to receive said active registration message, and a third time required for said OLT to receive an active registration acknowledgement message transmitted from said ONU in response to said active registration message.

13. The Gigabit Ethernet passive optical network as set forth in claim 12, wherein said desired replacement time is 14 msec.

14. The Gigabit Ethernet passive optical network as set forth in claim 13, wherein said first time is 10 msec, said second time is 2 msec, and said third time is 2 msec.

15. A link setup method using a Gigabit Ethernet passive optical network including an OLT and at least one ONU coupled to said OLT, said method comprising the steps of:
 a) determining whether there is a link set up based on an ID of said ONU upon receiving a registration request message from said ONU; and
 b) setting up an active link between said OLT and said ONU if there is no link set up and a standby link between said OLT and said ONU if there is a link set up;

wherein the OLT sets up the active link with the ONU via the standby link, and if a link has already been formed, said OLT sets up a double link;

providing a desired replacement time for replacing said standby link for said active link due to an error in said active link, said desired replacement time including a first time required for said OLT to determine whether there is an error in said active link, a second time required for said OLT to transmit said active registration message to said ONU over said standby link and for said ONU to receive said active registration message, and a third time required for said OLT to receive an active registration acknowledgement message transmitted from said ONU in response to said active registration message.

16. The link setup method as set forth in claim 15, wherein the active link setup at said step b) includes the steps of:
 registering said ID of said ONU included in said registration request message as an active link ID;
 allocating a bandwidth to said ONU in response to a bandwidth allocation request included in said registration request message;
 transmitting an active registration message for active link setup including information about the allocated bandwidth to said ONU; and
 setting up said active link with said ONU in response to said active registration message and receiving an active registration acknowledgement message transmitted from said ONU in response to said active registration message.

17. The link setup method as set forth in claim 15, wherein the standby link setup at said step b) includes the steps of:
 transmitting a standby message to said ONU to set up said standby link with said ONU; and
 setting up said standby link with said ONU in response to said standby message and receiving a standby acknowledgement message transmitted from said ONU in response to said standby message.

18. The link setup method as set forth in claim 17, further comprising the steps of:
 c) transmitting an active registration message to said ONU to replace said standby link for said active link if there is no message received over said active link for a predetermined time; and
 d) setting up said standby link replaced for said active link with said ONU in response to said active registration message and receiving an active registration acknowledgement message transmitted from said ONU in response to said active registration message.

* * * * *